No. 776,986. PATENTED DEC. 6, 1904.
J. A. BARTLETT, W. S. DOWNS & J. B. TILLMAN.
COTTON CHOPPER AND CULTIVATOR.
APPLICATION FILED JUNE 2, 1904.
NO MODEL. 2 SHEETS—SHEET 1.

WITNESSES
C. Edward Duffey
F. D. Ammen

INVENTORS
James A. Bartlett
William S. Downs
John B. Tillman
BY Munn & Co.
ATTORNEYS No. 776,986. PATENTED DEC. 6, 1904.
J. A. BARTLETT, W. S. DOWNS & J. B. TILLMAN.
COTTON CHOPPER AND CULTIVATOR.
APPLICATION FILED JUNE 2, 1904.
NO MODEL. 2 SHEETS—SHEET 2.
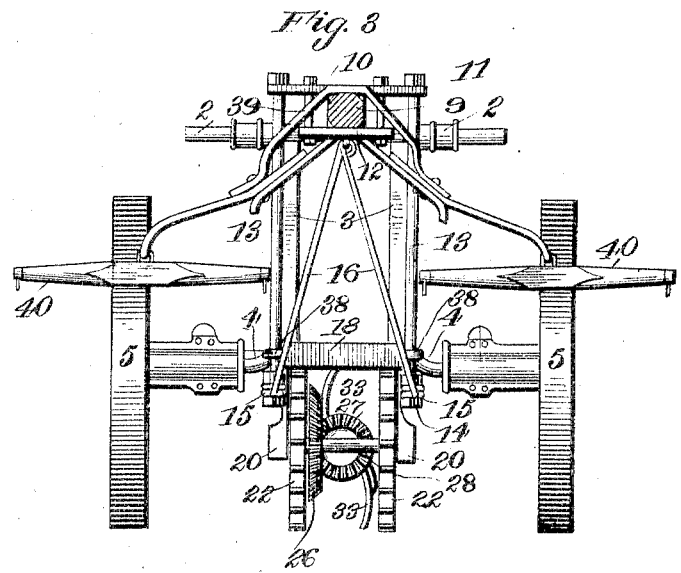
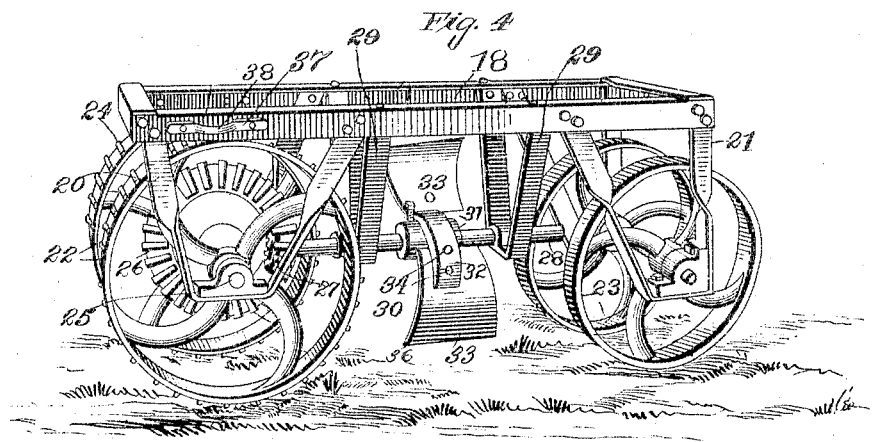
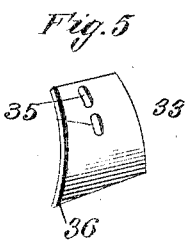
WITNESSES:
C Edward Duffey
F. D. Ammen
INVENTORS
James A. Bartlett
William S. Downs
John B. Tillman
BY Munn & Co.
ATTORNEYS No. 776,986. Patented December 6, 1904.

UNITED STATES PATENT OFFICE.

JAMES ALBERT BARTLETT, WILLIAM SYRUS DOWNS, AND JOHN BENONI TILLMAN, OF DARDANELLE, ARKANSAS, ASSIGNORS OF TWO-FIFTHS TO WILLIAM ANDREW JACKSON, OF DARDANELLE, ARKANSAS.

COTTON CHOPPER AND CULTIVATOR.

SPECIFICATION forming part of Letters Patent No. 776,986, dated December 6, 1904.

Application filed June 2, 1904. Serial No. 210,802. (No model.)

*To all whom it may concern:*

Be it known that we, JAMES ALBERT BARTLETT, WILLIAM SYRUS DOWNS, and JOHN BENONI TILLMAN, citizens of the United States, and residents of Dardanelle, in the county of Yell and State of Arkansas, have made certain new and useful Improvements in Cotton Choppers and Cultivators, of which the following is a specification.

Our invention relates to agricultural implements, and especially to the class of cultivators.

Our object is to provide an implement of simple construction intended for the purpose of chopping or thinning cotton in the field, the invention adapting itself readily to be applied to an ordinary cultivator as an attachment.

The invention consists in the construction and combination of parts which will be more fully described hereinafter and definitely set forth in the claims.

Figure 1:
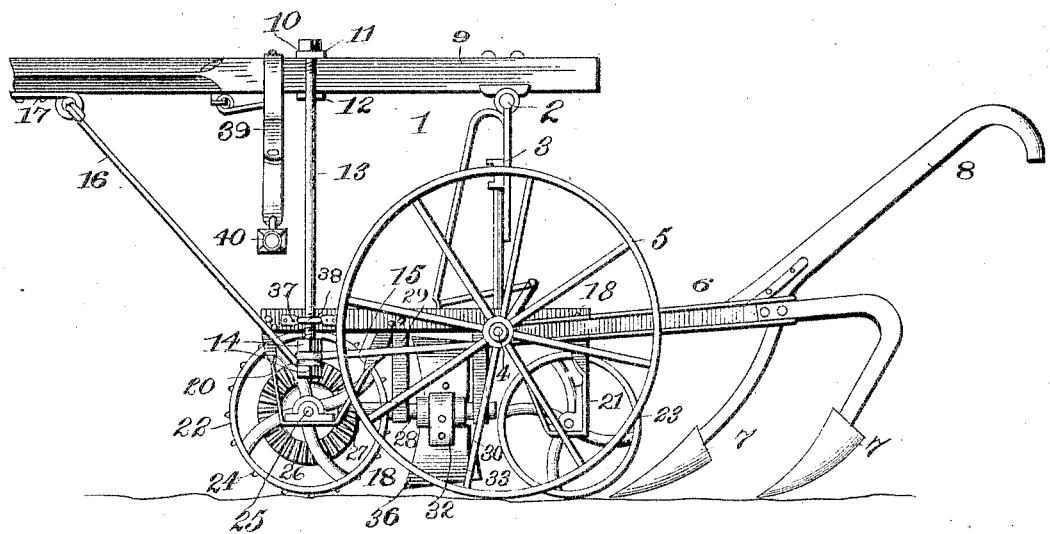
Figure 2:
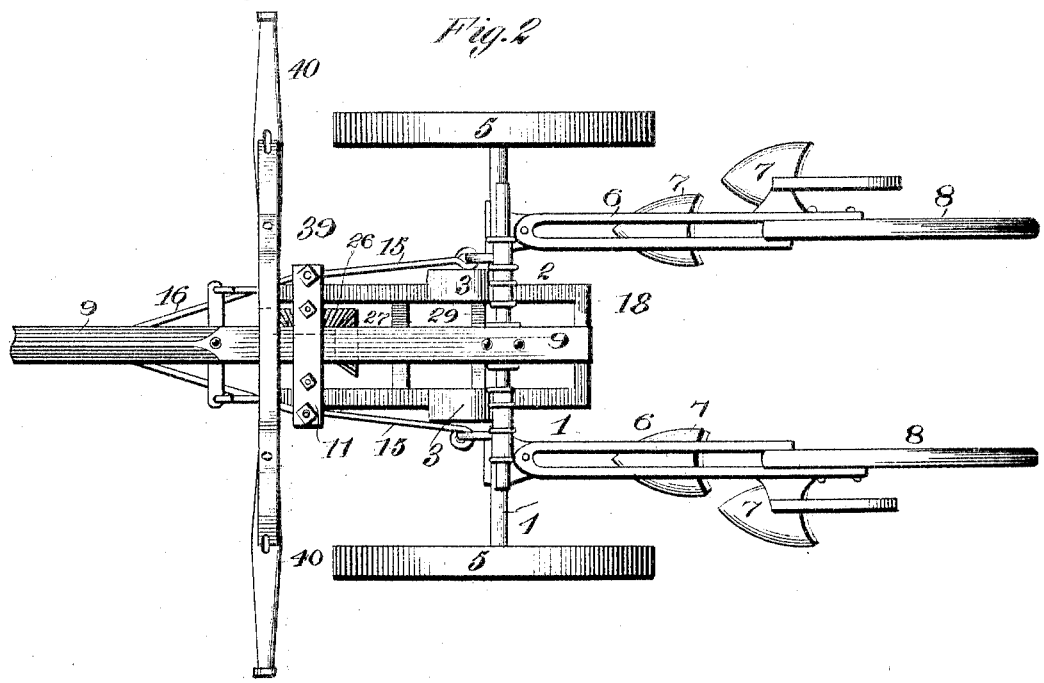

In the drawings, which fully illustrate our invention, Figure 1 is a side elevation of a cultivator to which our invention has been applied. Fig. 2 is a plan of the implement shown in Fig. 1. Fig. 3 is a front elevation showing the tongue of the implement in cross-section. Fig. 4 is a perspective of the chopper, represented as detached from the cultivator-frame. Fig. 5 is a perspective of one of the hoes constituting a part of the chopper.

Throughout the drawings and specification the same numerals of reference indicate like parts.

Referring more particularly to the parts and referring especially to Figs. 1 to 3, 1 represents the frame of the cultivator, which comprises an elevated cross-bar 2, to which oppositely-disposed standards 3 are attached, said standards carrying horizontal arms or spindles 4 at their lower extremities, which project laterally and horizontally in order to facilitate mounting the implement upon wheels 5, as shown. This frame 1 comprises rear extensions 6, carrying cultivator blades or hoes 7 and suitable handles 8. At substantially the middle of the cross-bar 2, referred to above, the rear extremity of the tongue or pole 9 is attached, and forwardly of the cross-bar 2 a cross-head 10 is clamped to the pole, as shown, the same comprising a main bar 11 disposed above the tongue and a clamping-bar 12 below the same. At the extremities of the main bar 11 vertical guide-bars 13 are arranged, the same extending downwardly, as shown. The lower extremities of these guide-bars 13 are threaded, as indicated, in order to receive nuts 14, which clamp between them the eyes of tie bars or braces 15 and 16, the former of which extend rearwardly and attach to the aforesaid wheel-arms 4, as indicated. The latter extend upwardly in an inclined direction and attach to the same anchor-plate 17, attached to the under side of the tongue. From this arrangement evidently considerable space is provided between the wheels 5 of the cultivator, and this space is occupied by the chopper attachment 18, which is represented detached in Fig. 4. This chopper attachment comprises a rectangular frame provided with depending hangers 20 and 21, which afford means for supporting, respectively, the rear wheels 22 and forward wheels 23. The front wheels 22 have ribs 24, which enable them to take firm hold on the ground over which the implement passes, and the axle 25, which connects these wheels, carries rigidly a bevel gear-wheel 26, which meshes with the second bevel-gear 27, the same being carried by a longitudinally-disposed shaft or axle 28, supported beneath the frame in suitable hangers 29. Upon this axle 28 a chopping-tool 30 is rigidly mounted, the same comprising a hub 31 with curved arms 32, to the forward faces of which hoes or blades 33 attach by means of bolts 34. One of these hoes is very clearly illustrated in Fig. 5. Each hoe is provided with a pair of slots 35, disposed substantially radially in order to enable the position of the hoes to be adjusted radially with respect to the axis of revolution. As shown most clearly in Fig. 4, the forward edges 36 of these hoes project below the rear edges, so as to facilitate the cutting and removing of the earth, it being understood that as the implement advances these hoes are rotated continuously over the cotton, so as to chop out portions of the rows of the plants in the well-known manner.

The side bars of the chopper-frame 18 are provided on the outer side and near their front ends with attachments 37, having lateral curves or projecting portions 38, which form loops or keepers adapted to receive the vertical guide-rods 13, as shown in Figs. 1 and 3. These loops fit loosely on the guides 13 and are therefore adapted to slide easily thereon. They constitute the means of connection for the draft devices between the chopper attachment proper and the frame of the cultivator. It is obvious that the chopper attachment is thus free to move vertically or rise and fall independently of the cultivator-wheels 5. Thus the four wheels 22 and 23 of the chopper attachment and the frame 18, connected therewith, work vertically and independently of the cultivator; but the front wheels 22 will take hold on the soil, so as to communicate rotation to the choppers 23. It is found in practice that where the ground is in a very soft condition the wheels 22 sink in to a greater depth, so that it may be necessary in certain instances to adjust the hoe-blades 33 radial, such adjustment being possible by reason of the elongated openings or slots 35.

For the purpose of enabling the implement to be drawn along by horses a cross-tree 39 of any suitable construction is attached at the rear of the pole and preferably forwardly with respect to the guide-bars 13, swingletrees 40 being attached to its extremities, as shown.

In actual practice a lever of common construction will be arranged to enable the chopper to be raised in turning corners or in going to and from the field.

Having thus described our invention, what we claim as new, and desire to secure by Letters Patent, is—

1. The combination, with the wheel-frame having a suitable draft attachment and provided with vertical guide-bars arranged at the front and spaced apart, of a chopper attachment comprising a rigid frame having loops adapted to slide on the aforesaid guide-bars, and having pendent hangers, transverse axles having bearings therein, wheels mounted on said axles, and a bevel-gear keyed on the front axle, a horizontal shaft arranged lengthwise between the pairs of wheels and geared with the aforesaid bevel-gear and provided with choppers proper, and pendent hangers in which the chopper-shaft has its bearings, substantially as described.

2. In combination a main frame, wheels supporting the same, a tongue attached to said main frame, a cross-bar attached to said tongue, guide-bars attached to said cross-bar and extending substantially vertically downward therefrom, braces connecting the extremities of said guide-bars with said tongue and said main frame, a chopper-frame disposed between said guide-bars and having loops receiving the same, a chopper-tool carried by said chopper-frame and rotating upon a longitudinally-disposed axis, wheels supporting said chopper-frame and means whereby said wheels may drive said chopper-tool.

JAMES ALBERT BARTLETT.
WILLIAM SYRUS DOWNS.
JOHN BENONI TILLMAN.

Witnesses:
J. F. GRUBBS,
CHAS. HUNT.